June 20, 1944. K. F. NYSTROM 2,351,698
RECLINING SEAT FOR PASSENGER VEHICLES
Filed April 25, 1942 5 Sheets-Sheet 1

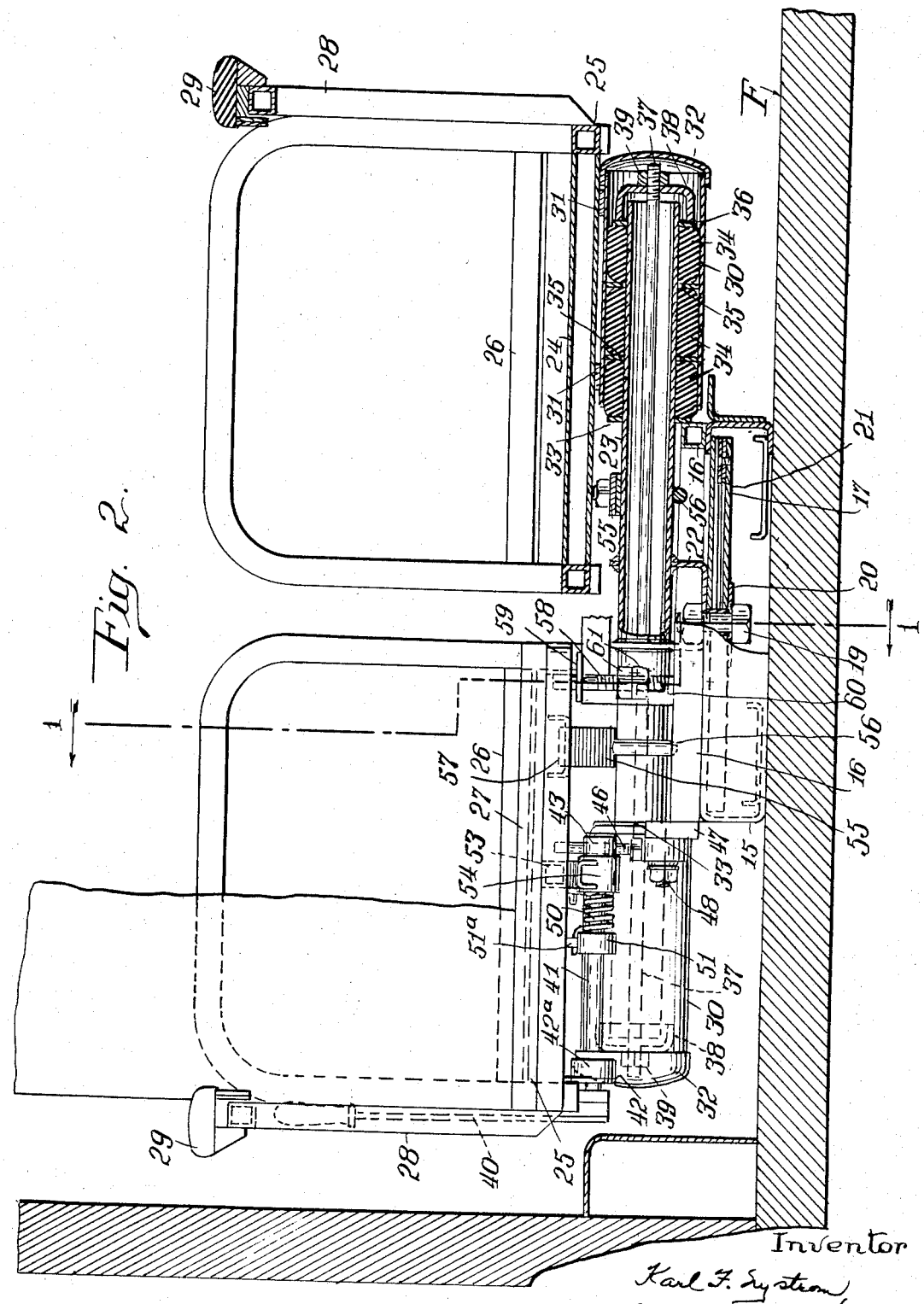

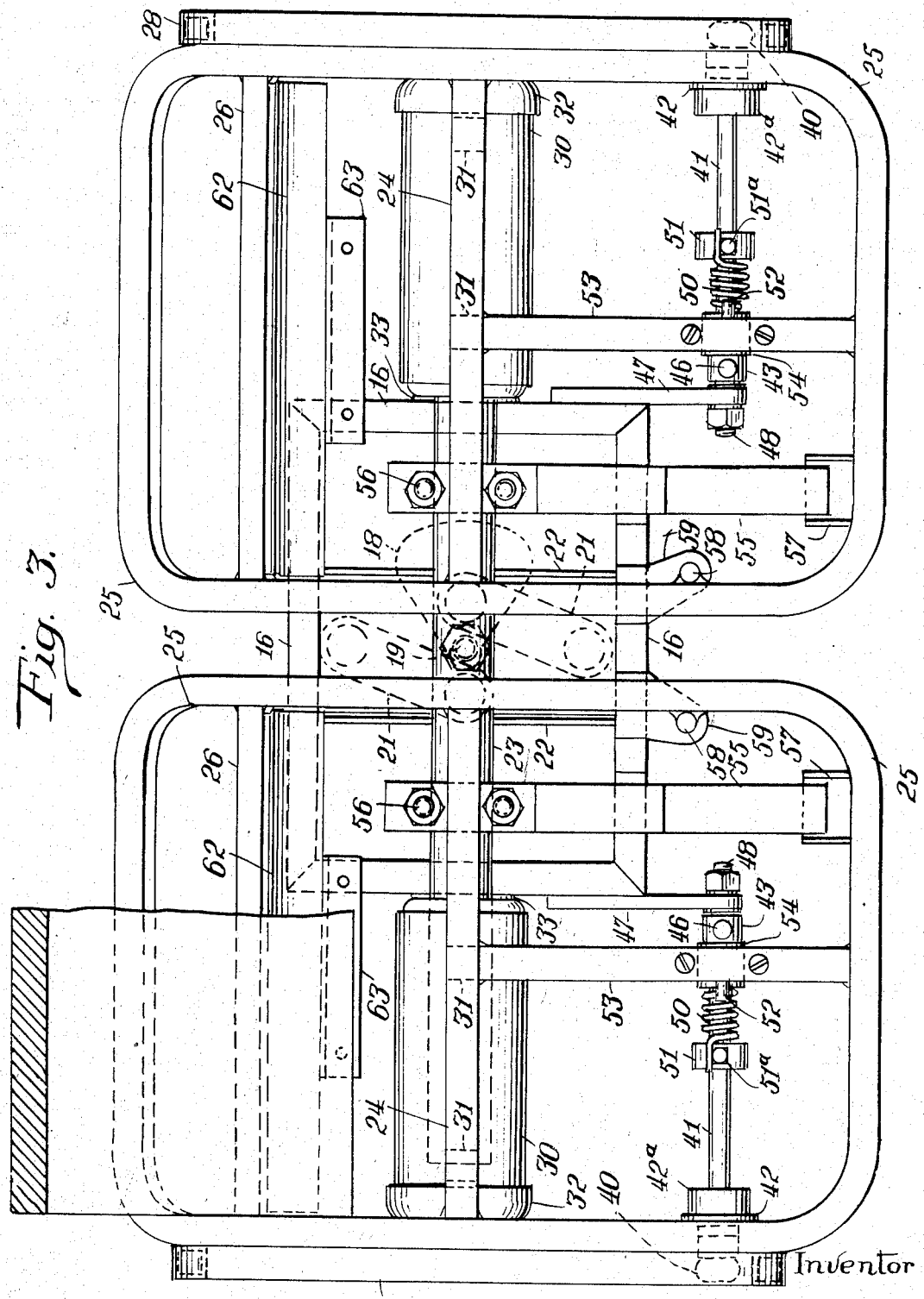

June 20, 1944.  K. F. NYSTROM  2,351,698
RECLINING SEAT FOR PASSENGER VEHICLES
Filed April 25, 1942   5 Sheets-Sheet 4
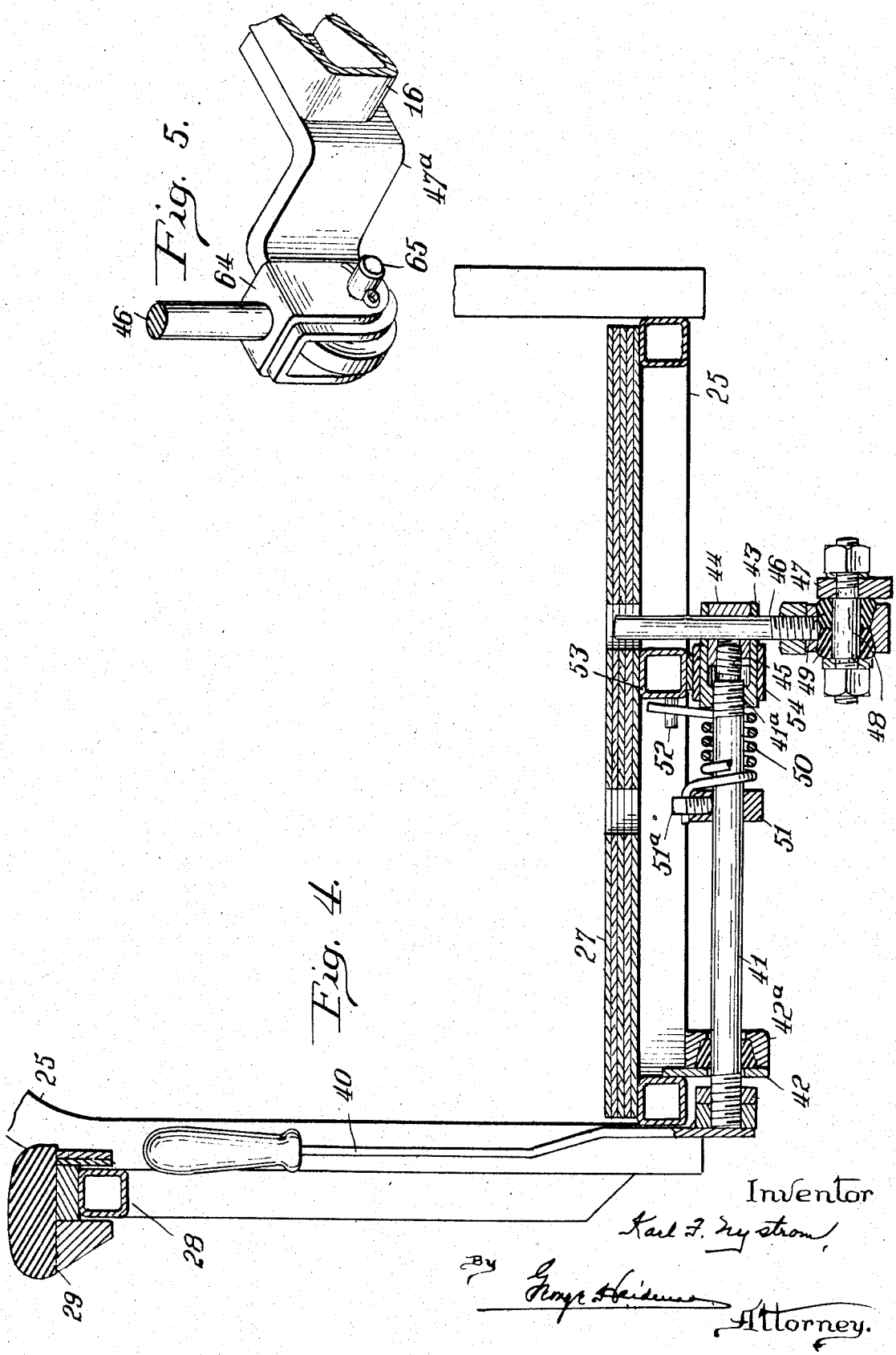

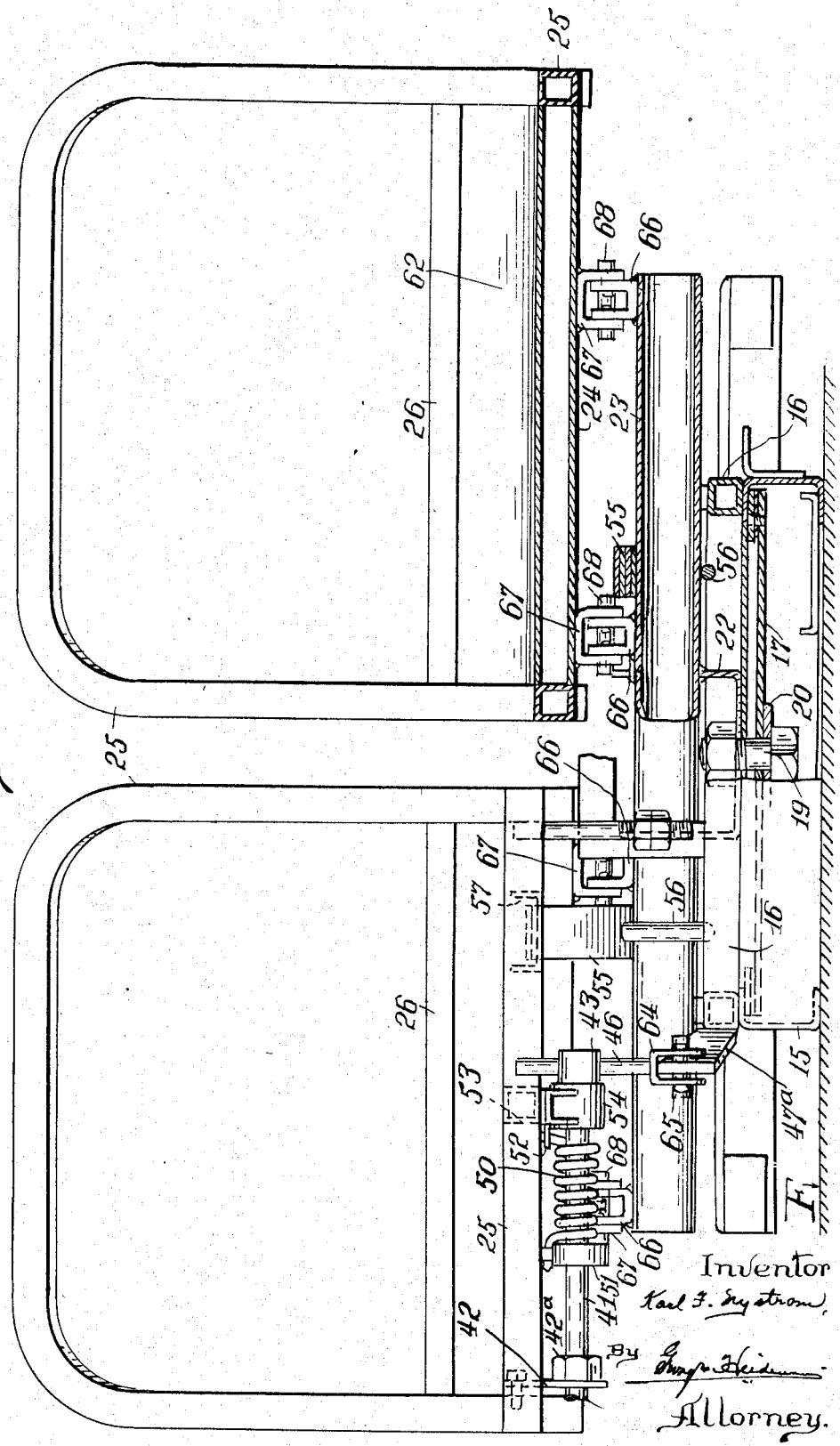

Patented June 20, 1944

2,351,698

UNITED STATES PATENT OFFICE 2,351,698

RECLINING SEAT FOR PASSENGER VEHICLES

Karl F. Nystrom, Milwaukee, Wis.

Application April 25, 1942, Serial No. 440,469

8 Claims. (Cl. 155—116)

My invention relates especially to reclining seats for railroad passenger cars and more particularly to reclining seats arranged in pairs and mounted on a common immovable base, each seat, however, being independently adjustable from an upright seating position into a partial or complete reclining position in keeping with the wishes of the occupant.

The invention has for its object the provision of a reclining seat for passenger coaches whose seat proper and back move or tilt together as a unit about a center axis of the seat whereby improper shifting of the occupant's body is prevented, proper support for the body provided and the desired degree of body reclination is within the control of the occupant.

Another object of the invention is the provision of a structure whereby the maximum or required spacing between the respective seats arranged in the same longitudinal row will be substantially maintained and proper clearance or passage for the occupant of the adjacent seat of the pair provided.

A further object of the invention is the provision of a structure whereby the paired seats may be bodily or horizontally swung about their common axis or king-pin and the king-pin made to move through a defined orbit in order that the seat-arms of the two seat unit will be prevented from striking the wainscoting or side wall of the car, necessary rotation of the units permitted and the respective seats made to face toward the opposite end of the car.

Another object of the invention is the provision of a seat of the character mentioned wherein the front edge of the seat proper moves upwardly and rearwardly, but not forwardly, when the seat is tilted, while the arms always remain in the same relative position with regard to the seat back and seat proper, thus providing for a simple arm construction involving less cost in manufacture. The invention also involves means whereby the too rapid reclining movement of the seat is prevented after the occupant's center of gravity passes the center of movement of the tilting mechanism.

The foregoing enumerated objects and advantages as well as other advantages inherent in the invention will all be readily comprehended from the detailed description of the accompanying drawings wherein—

Figure 2 is a sectional view taken on the line 2—2 of Figure 1 as viewed by the arrows.

Figure 3 is a plan view with a portion of a back of one seat in sectional elevation and with the cushions removed.

Figure 4 is a sectional view on the offset line 4—4 of Figure 1 looking in the direction of the arrows.

Figure 5 is a perspective view showing a modified form of strut mounting of the vise mechanism.

Figure 6 is a sectional view similar to Figure 2, with the cushions, the arm-rests and operating levers omitted and illustrating a modification of the method of mounting the seats.

Figure 1:
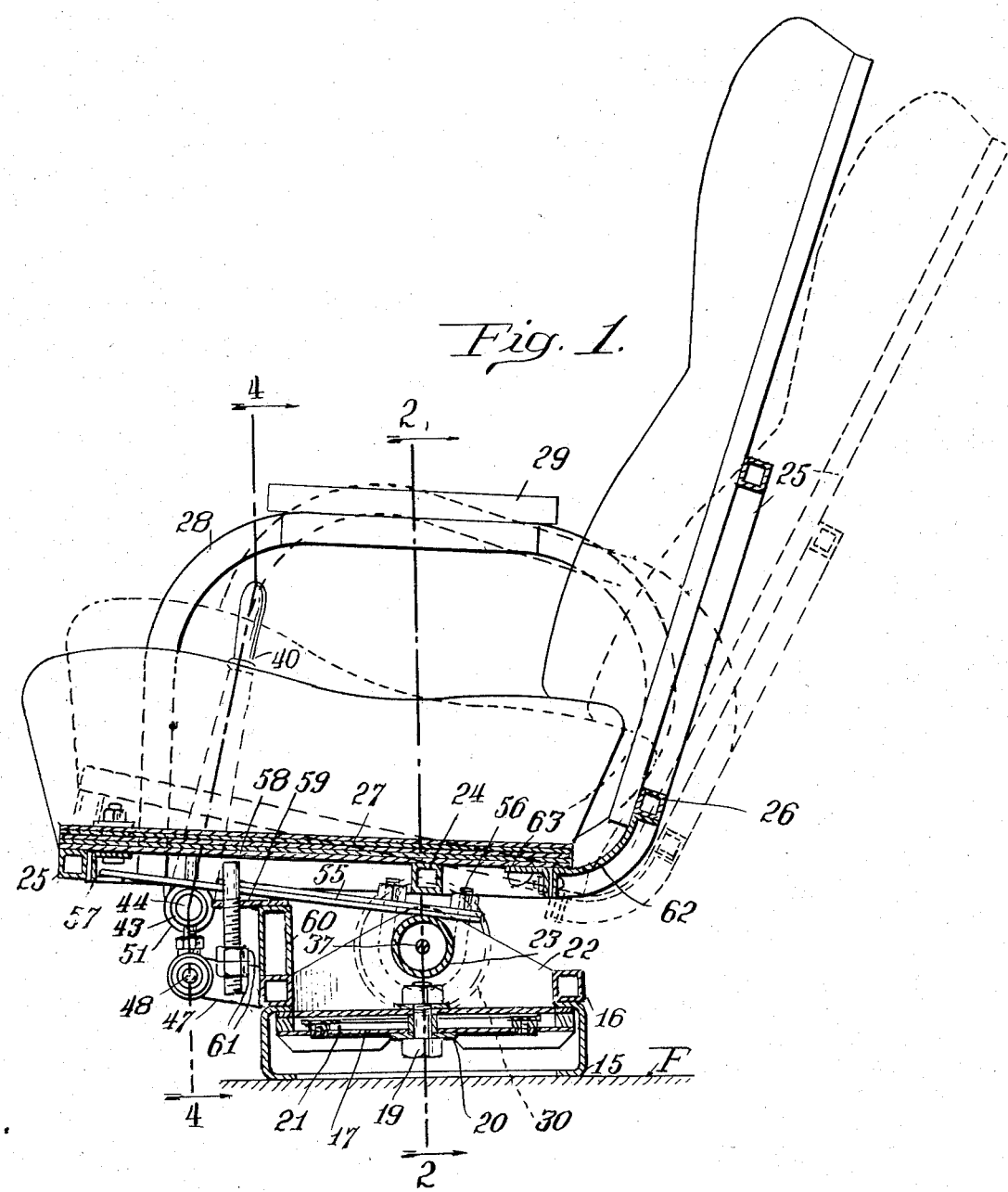
Figure 1 is a vertical sectional view taken substantially on the line 1—1 of Figure 2, looking in the direction of the arrows with the seat and back cushions in outline and in normal position, while the reclining or tilted position of the seat and back are indicated in dotted lines.

In the particular exemplification of the invention as disclosed in Figure 1, the permanent base 15, which is immovably secured at the preselected point to the car-floor F, supports a non-tilting revolvable frame or base 16 through the medium of a cam-plate 17 which preferably is welded in the permanent base 15. The cam-plate 17 is provided with an elliptical or somewhat heart-shape opening, as shown in dotted lines at 18 in Figure 3, which receives the king-pin 19; the non-tilting revolvable frame 16 being slidably secured on the immovable or permanent base 15 by a large metal washer 20 which is of size sufficient to prevent withdrawal through the heart-shape opening 18. The revolvable non-tilting base or frame 16 is controlled by links 21, 21 (shown in dotted lines in Figure 3) connected at one of their ends to the revolvable non-tilting base 16 and at their other ends to the cam plate 17 of the stationary pedestal 15. These links cause the king-pin 19 to describe an orbit substantially similar to the heart-shape hole or opening 18 in the cam plate 17 when the seat unit is revolved to face in the opposite direction; the travel of the king-pin in the cam-plate opening permitting the seat unit carrying frame 16 to shift sufficiently away from the car side wall where the arm of the adjacent or inner seat of the unit will not strike the wainscoting of the car.

The non-tilting base 16 is bridged across the pedestal or permanent base 15 in order that the king-pin 19 may be attached to the non-tilting frame 16 through the medium of the U-shape bracket 22 which also receives the seat unit support tube member 23 (to which it is preferably welded as shown in Figure 2), thus enabling the support tube or shaft and the non-tilting frame 16 to be secured at one and the same time to the permanent base through the medium of the king-pin.

The tubing 24 (preferably of rectangular cross section) constitutes the master support for the seat bottom and extends transversely of each seat, as shown in Figure 3; and this tubing also constitutes the medium through which the pivoting mechanism therebeneath is secured to the seat. The seat frame preferably consists of preshaped tubing 25 welded or properly secured to the ends of the tubing 24, and provided with a cross-brace or tube 26 to which suitable plywood is secured which may be employed in the construction of the seat proper as shown at 27, Figure 1. The outer sides of the frames 25 (namely the sides removed from the adjacent seat) are each provided with a suitable arm 28, preferably also shown constructed of square metal tubing bent into the inverted somewhat U-shape configuration, see Figure 1, with the intermediate top portion made substantially straight and provided with a suitable padding or cushion as at 29. The arms 28 are rigidly secured to the frames 25 so as to remain in the same relative position with regard to the back and the seat; that is to say, the arms will move or tilt upwardly at the front and downwardly at rear in keeping with the tilting movement of the seats as shown in dotted lines in Figure 1.

The seat is so secured to the sub-structure that it does not move forwardly but the front of the seat moved upwardly and somewhat rearwardly when the seat is tilted, as shown in dotted lines in Figure 1, and consequently does not materially decrease the normal spacing between it and the seat immediately forward.

The seat unit supporting shaft or tube 23 at its ends extends into shells 30, 30 which are secured to the respective seats by blocks 31, so as to prevent the seats moving independently of the tubes or shells 30, whose outer ends are preferably provided with closure caps 32. Adjacent the inner ends of each shell 30, the supporting shaft or tube 23 has an apertured plate or washer 33 (which is not secured to the shell 30) mounted thereon; the washer 33 being immovably secured to the non-tilting frame 16 as by welding, see Figure 2. The shells 30 are each provided with rubber blocks or pads 34 concentrically arranged on the support shaft 23; and the shell provided with spaced metal plates 35 integrally united with the shell 30 against movement and disposed adjacent the inner ends of the rubber pads or cushions 34; the innermost pad 34 being maintained in position by the plate or washer 33 secured to the non-tilting frame 16; while the outermost pad 34 is held within the shell 30 by a follower plate or washer 36. The hollow supporting shaft or tube 23 has a rod 37 extending longitudinally therethrough and the outer ends of the rod are screw-threaded as shown in Figure 2. The ends of the rod are each provided with a cupped plate or washer 38 whose perimeter is arranged in contact with the follower plate 36 and causes the latter to place the rubber pad or cushions 34 under compression when the nut or nuts 39 are screwed up on the threaded ends of the rod 37. As is apparent, screwing up of nut 39 forces follower-plate 36 inwardly, compressing the outer pad 34 and through the medium of the plates 35 and shell 30 places the inner pad 34 under compression against immovable washer 33; the rubber pads or cushion members 34 effecting binding or frictional relation with the shells 30 and the supporting shaft or tube 23, so that the pads will be in torsion when the seat is tilted and the outer shell 30 is rotated; the pads or cushion 34 providing a non-vibrating relation between the mechanism.

The seats are normally locked against tilting movement and the degree of tilting controlled by certain mechanisms located beneath the seat frame; the mechanisms being independently controlled by the respective hand levers 40 which are secured to the outer ends of their respective shafts or rods 41 supported at their outer ends by depending brackets 42 through the medium of rubber bushings and cup member, as shown at 42ª in Figure 4; the shaft 41 extending through a large hole in plate or bracket 42.

Each shaft 41 at its inner end is provided with a predetermined number of screw-threads 41ª, namely preferably approximately eighteen right-hand threads to the inch, which are screwed into an outer shell 43 of a vise mechanism which also involves an inner shell 44 which screws onto the reduced threaded end 45 of rod 41 which is provided with a predetermined number of left-hand threads, namely approximately twenty left-hand screw-threads to the inch. The vise forming members or shells 43 and 44 are provided with aligned holes, namely holes that are drilled through both shells at the same time, which receive the strut 46 whose lower end is supported by and secured to a bar 47 which is welded or rigidly secured to the non-tilting revolvable frame 16 (see Figure 3). The lower end of strut 46 (in the form of a built-up eye-bolt) is secured to bar 47 by bolt 48 which is preferably provided with rubber washers 49 placed under compression by the nut and washer on the end of the bolt 48.

As shown in Figure 3 each seat of the unit is provided with similar control or locking mechanism and each seat on the side removed from its companion seat is provided with a hand lever 40 in order that the position of each seat may be independently controlled by its occupant.

The vise mechanism, which is mounted beneath each seat frame, effects biting or gripping relation with the upstanding rod or strut 46 which latter is immovably secured to the non-tilting frame 16 through the medium of bar 47.

The lever operated rod or shaft 41 is provided with a torsion spring 50 which normally rotates shaft 41 and hence movement of the shells 43 and 44 in strut clamping direction through the medium of the collar 51 secured to rod 41 by the set-screw shown at 51ª, see Figure 4; while the other end of the spring is held against movement by stop means 52 secured to the tubing or member 53 secured or welded to the seat frame; the tubing 53 also having an immovable collar 54 secured thereto, which in turn rotatably supports the outer shell 43 of the vise mechanism and which, as before stated, also includes the inner shell 44. When the occupant of the seat oscillates lever 40, shaft or rod 41 is rotated against the action of the spring and causes shell 43 to ride to the left in Figure 4 and inner shell 44 to ride to the right, thereby aligning the holes in the shells and releasing their bite on the strut 46; the operator holding lever 40 until he has tilted the seat to its desired reclining position.

When the hand lever 40 is released by the occupant, the torsional spring 50 (in addition to the torsion of rubber cushions 34) causes shaft 41 to return to normal position and induce the inner shell or vise member 44 to move to the left and the outer shell or vise member 43 to move to the right in Figure 4, causing both shells to effect a biting or clamping relation with the strut 46 which locks the seat in its adjusted position against tilting movement.

In order to control the too rapid tilting movement of the seat after the occupant's center of gravity is past the center of the tilting mechanism, each seat is provided with a dampener or cushioning means which is shown in the nature of flat springs 55 whose inner ends are secured to the seat supporting tube or shaft 23 by the U- bolts 56, while the outer or free ends of the springs extend loosely into the pocket or socket member 57 secured to the bottom of the forward end of the seat; the springs 55 exerting a downward pressure against the upward movement of the front of the seat after the seat has been tilted to a predetermined extent.

In order to limit the degree of tilting movement and also provide a safety mechanism in the event of failure of the vise mechanism, the seat frame 25 adjacent its forward end is provided with a depending threaded pin or bolt 58 whose upper end is welded or rigidly secured to the frame 25. The pin 58 extends loosely through an opening in the horizontal portion of an angular plate 59 which is rigidly secured to an upwardly disposed post or extension 60 secured to the forward end of the revolvable non-tilting frame 16. The lower end of the pin 58 is provided with nuts 61 which will contact the bottom of plate 59 when the seat is tilted a predetermined degree and prevent further tilting movement. In the event of failure of the vise mechanism, the nuts 61 may be screwed up on pin 58, while the seat is in normal or upright position, into firm contact with plate 59 and thereby lock the seat against tilting movement.

In order to prevent the occupant of the seat to the rear placing his toe into the space between the cushions of the seat proper and of the back, I secure an arcuate kick-plate 62 to the bottom of the seat proper and to the cross-brace 26 (see Figure 1); the plate 62 extending the full width of the seat and being bolted or otherwise rigidly secured in place.

The kick plate 62, intermediate its ends, has an angle bar 63 secured thereto; the angle bar affording means for supporting the seat-boards 27 which are secured to the angle bar 63.

Figure 5 is a perspective view of a modified form of mounting the lower end of the upright strut 46 of the vise mechanism. In this modification the strut 46 is provided with a clevis member 64 suitably secured to the lower end of the strut 46 and the jaws of the clevis member 64 receive the laterally off-set or bent bar or extension 47ª secured to the non-tilting frame 16— the bar 47ª taking the place of bar 47 previously described. The end of bar 47ª is provided with a hole adapted to register with holes in the jaws of the clevis member 64 and adapted to receive the pin 65, which may be held in place by cotter-pins as shown.

In Figure 6 I show a modified manner of tilt-ably mounting the seats which involves the metal frames 25 with the support member 24 extending transversely of each seat and to which the tilting mechanism therebeneath is secured; the seat and back cushions, the arm-rests and hand levers which are similar to those shown in the preceding figures having been omitted.

The seat unit (consisting of two aligned seats) mounted on the permanent base or pedestal 15, which is immovably secured to the car-floor, has the same type of revolvable non-tilting frame or base 16 secured to the base or pedestal 15 through the medium of the cam-plate 17, king-pin 19 and U-shape bracket 22; the bracket 22 providing support for the main unit support or member 23 which preferably is welded to the bracket against movement. The support tube or member 23 has the dampener springs 55 secured thereto as heretofore described.

The top of the support tube or member 23 has a pair of U-shape blocks 66 (a pair for each seat) integrally secured thereto; while the frame or support member 25, coincident with the blocks 66, has a pair of clevis members 67 intimately secured thereto; the clevis members 67 being adapted to straddle the U-shape blocks 66. The sides of the blocks 66 and the clevis members 67 have registering holes to receive the hinge-pins 68 held in place in any suitable manner as by cotter-pins or the like.

This hinge so arranged permits each seat to be independently tilted backwardly by the occupant upon shifting the hand lever 40 (shown in Figures 1, 2 and 4) sufficiently to release the vise mechanism consisting of shaft 41, spring 50, concentric sleeves 43, 44 and strut 46 which is similar to the construction shown in Figure 5 and secured to the off-set end 47ª of the bar 47 shown in Figures 3 and 4.

The seats tilt into reclining position about the hinge-pins 68 and hence about the main support member or tube 23 without permitting the seat proper or cushion to move forwardly; the seat-arms also tilting upwardly at their forward ends and maintaining their original relation to the seats and seat back; the tilting movement being yieldingly controlled by the leaf spring 55 which are constructed and arranged as heretofore described and the tilting of the seat into reclining position being permitted after the vise mechanism has been actuated into non-gripping position.

In my improved seat construction, the holding or vise mechanism provides an unlimited number of reclining positions in keeping with the wishes of the occupant as the seat may have any degree of inclination. Furthermore, the unitary or integral seat and back frame, which tilt as a unit, provides a stronger construction and decreases deflection between the seat and the back when subject to additional load; and the tubular arm construction affords the occupant the maximum space possible for arm rest spacing.

Then, too, the leaf springs prevent the seat tilting too easily when passing the center of support, thus eliminating the "falling sensation" encountered with tilting seats as at present constructed; while the regulable tilt limiting means may also be employed for locking the seat against tilting movement in the event of failure of the vise mechanism.

The constructions illustrated and described are believed to be the best embodiments of the invention, but modifications in certain respects are possible and may be made without, however, departing from the spirit of my invention as defined in the appended claims.

What I claim is:

1. A reclining seat comprising a seat and back forming frame; an immovable base; a horizontally disposed seat supporting shaft immovably mounted on said base; a rubber bushing containing shell associated with the seat-bottom and concentrically arranged about said shaft; regulable means whereby the rubber bushing is placed under compression into binding relation with said shell and with the supporting shaft and a non-metallic mounting between the seat and said supporting shaft provided; a rigid vertically disposed member immovably supported on the base; a pair of spring controlled vise members adapted to effect binding relation with said vertically disposed member whereby the seat is locked against tilting movement; and a hand operated lever whereby said vise members may be moved out of binding relation with said vertically disposed member when the seat is to be tilted.

2. A reclining seat comprising an immovable base; a non-tilting frame mounted on said base and provided with a horizontally disposed shaft adapted to support a pair of seats; independent cushioning means for tiltably securing each seat to said shaft; means whereby said cushioning means may be regulated; means associated with each seat for resisting the tilting movement after the seat has tilted a predetermined degree; means whereby each seat is normally locked against tilting movement, said means involving a rigidly secured strut beneath each seat, a spring controlled shaft rotatably mounted on the bottom of said seat and oppositely screw-threaded at one end, a pair of concentric vise members arranged on the threaded end of the shaft and each member controlled by an oppositely threaded portion of the shaft, said members each having a hole therethrough adapted to receive the strut and to effect binding relation therewith when the shaft rotates through the influence of the spring; and a hand operated lever secured to said shaft whereby the latter may be rotated against the action of its spring and the vise members moved out of binding relation with the strut.

3. A reclining seat comprising an immovable base; an immovable horizontally disposed shaft; a rigidly connected seat and back frame arranged above said shaft; means operatively connected with the bottom of the seat and with said shaft whereby the seat-frame is tiltably secured to said shaft; automatic vise mechanism operatively intermediate the bottom of the seat and said base and involving an upstanding element immovably secured to the base, a pair of oppositely moving element gripping members, a spring controlled shaft on which said members are threaded and made to move into gripping position and the seat locked in its adjusted positions; and a hand-lever mounted on the seat-frame and on one end of the spring controlled shaft whereby the latter may be rotated and said gripping members moved out of gripping position thereby permitting the seat to tilt about said first mentioned shaft.

4. A reclining seat comprising an integrally united seat and back frame; an immovable base provided with a strut; a horizontally disposed shaft immovably carried by the base; means whereby said frame is tiltably mounted on said shaft, said means being secured to the bottom of the seat and yieldingly held against movement about the shaft; spring controlled mechanism adapted to effect gripping relation with the strut whereby said frame is locked in its adjusted positions; and an oscillative hand-lever mounted on said frame and adapted to shift said mechanism out of locking position.

5. A reclining seat comprising an integrally united seat and back frame; an immovable base provided with an upstanding portion; a horizontally disposed seat supporting shaft immovably mounted on the base; means secured to the bottom of said frame and disposed about said shaft whereby said frame is tiltably secured to said shaft; cushioning elements intermediate the shaft and said means whereby the latter is yieldingly held against rotation about said shaft; dampener means for yieldingly resisting the tilting movement of said frame; spring controlled mechanism normally effecting holding engagement with the upstanding portion of said base whereby said frame is locked in its adjusted positions; and a hand lever secured to the frame and operatively connected with said mechanism whereby the latter may be moved out of locking position.

6. A reclining seat comprising an immovable base with an upstanding strut; a horizontally disposed shaft non-rotatably mounted on the base; an integrally united seat and back frame arranged above said shaft; a rubber bushing containing shell secured to the seat-frame and disposed about said shaft whereby the frame is tiltably secured to said shaft; regulable means whereby the rubber bushings are forced into frictional relation with said shaft and shell; a spring controlled rotatable shaft provided with a pair of oppositely moving strut gripping members whereby the frame is locked against tilting movement and held in its adjusted positions; regulable means whereby the maximum tilt of the frame may be controlled; and a hand-lever secured to the frame and operatively connected with said spring controlled shaft whereby the strut gripping members may be held out of locking position.

7. A reclining seat comprising a seat and back forming frame; an immovable base provided with an upstanding strut; a horizontally disposed non-movable seat supporting shaft mounted on said base; a rubber bushing containing shell immovably secured to the seat-bottom and disposed about said shaft; regulable means whereby the rubber is placed under compression into gripping relation with said shell and the seat supporting shaft and the rubber placed in torsion when the seat is tilted; a lever operated shaft rotatably mounted beneath the seat; a torsion spring for returning said last shaft to normal position, said shaft being provided with oppositely disposed screw-threads; and a pair of apertured strut receiving shells threaded, respectively, on the oppositely disposed screw-threads of said shaft and adapted to effect biting engagement with the strut, thereby locking the seat against tilting movement.

8. A reclining seat comprising an immovable base; a non-tilting frame mounted on said base and provided with a transversely disposed immovable shaft adapted to support a pair of seats arranged at opposite sides of the vertical axis of said frame; a shell disposed about each end of said shaft and immovably secured to the bottom of the superposed seat; rubber pads arranged in said shells and apertured for passage of said shaft therethrough; adjustable follower means arranged on the shaft and within the shells whereby the rubber pads are forced into gripping relation with said shaft and said shells and tilting of the seats yieldingly resisted; and means whereby each seat is normally locked to said frame against tilting movement, said means involving an upstanding strut carried by said frame, a torsion spring controlled shaft rotatably mounted on the bottom of each seat and having oppositely threaded portions, a pair of apertured shells through which the strut passes, said shells being threaded, respectively, on the oppositely threaded portions of the shaft and normally in gripping relation with the strut; and a hand operated lever on each seat whereby the spring controlled shaft may be rotated against the action of the spring and the shells caused to move in opposite directions out of gripping relation with the strut and the seat permitted to tilt into desired reclining position.

KARL F. NYSTROM.